United States Patent [19]
Uno et al.

[11] Patent Number: 5,041,931
[45] Date of Patent: Aug. 20, 1991

[54] PLURAL DISC ARRANGEMENT AND COOLING SYSTEM THEREFORE

[75] Inventors: Hiroshi Uno, Yokohama; Takao Hakamatani, Kawasaki; Toshiharu Nishioka, Yokohama, all of Japan

[73] Assignee: Fujitsu Limited, Kawasaki, Japan

[21] Appl. No.: 400,912

[22] Filed: Aug. 30, 1989

[30] Foreign Application Priority Data

| Sep. 1, 1988 | [JP] | Japan | 63-218893 |
| Sep. 1, 1988 | [JP] | Japan | 63-218894 |
| Sep. 1, 1988 | [JP] | Japan | 63-218895 |

[51] Int. Cl.⁵ .................................. G11B 33/14
[52] U.S. Cl. ........................................ 360/97.03
[58] Field of Search ...................... 360/97.02, 97.03

[56] References Cited

U.S. PATENT DOCUMENTS

| 3,729,201 | 4/1973 | Dollenmayer . |
| 3,912,278 | 10/1975 | Teutsch . |
| 4,763,211 | 8/1988 | Yamamoto et al. . |

FOREIGN PATENT DOCUMENTS 56-165963 12/1981 Japan ............................ 360/97.03

OTHER PUBLICATIONS

"Mechanical Design of a Large Disc Drive", Smith, Hewlett-Packard Journal, vol. 35, Jan. 1984, No. 1, pp. 20–22.
"Removable Cartridges Combine Portability with High Reliability", Hinkley et al, Computer Technology Review, vol. 4, Feb. 1984, No. 1, pp. 223–226.
IBM Technical Disclosure Bulletin, vol. 28, No. 12, May 1986, p. 5403.
Patent Abstracts of Japan, vol. 10, No. 149 (P-461) [2206], May 30, 1986 of Japanese Patent Appln. No. 61-3326, Jan. 9, 1986.

*Primary Examiner*—A. J. Heinz
*Attorney, Agent, or Firm*—Armstrong, Nikaido, Marmelstein, Kubovcik & Murray

[57] ABSTRACT

A rotating disc device for storing digital data, comprising: a storage unit containing a spindle motor, a disc for storing digital data thereon and rotating by being driven by the spindle motor, a head for writing and reading data on the disc, and a positioning mechanism for positioning the head; a driver circuit for driving the spindle motor and the positioning mechanism; and a control circuit for controlling the storage unit. A first power supply unit for supplying electric power to the driver circuit, is positioned adjacent to the driver circuit; and a second power supply unit for supplying electric power to the control circuit, is positioned adjacent to the control circuit. Further, a first cooling fan is provided for cooling the first power supply unit, the storage unit, and the driver circuit; and a second cooling fan is provided for cooling the second power supply unit and the control circuit.

9 Claims, 8 Drawing Sheets

PLURAL DISC ARRANGEMENT AND COOLING SYSTEM THEREFORE

BACKGROUND OF THE INVENTION

1. Field of the Invention

The present invention relates to a rotating disc device.

A rotating disc device, such as a magnetic disc device or an optical disc device, is used as an external storage device.

Large size disc devices usually each contain in a casing called a locker, an aggregation of a plurality (for example, four or eight) of rotating disc devices, where each of the devices comprises a rotating disc, a head for writing and reading data on the disc, and positioning mechanism for positioning the head, and independently operating as a rotating disc device.

In particular, in a large computer system, a large number of rotating disc devices are aggregated, and therefore, decreases in the total scale of the aggregated disc devices, power consumption, and noise, are required.

2. Description of the Related Art

Figure 1:
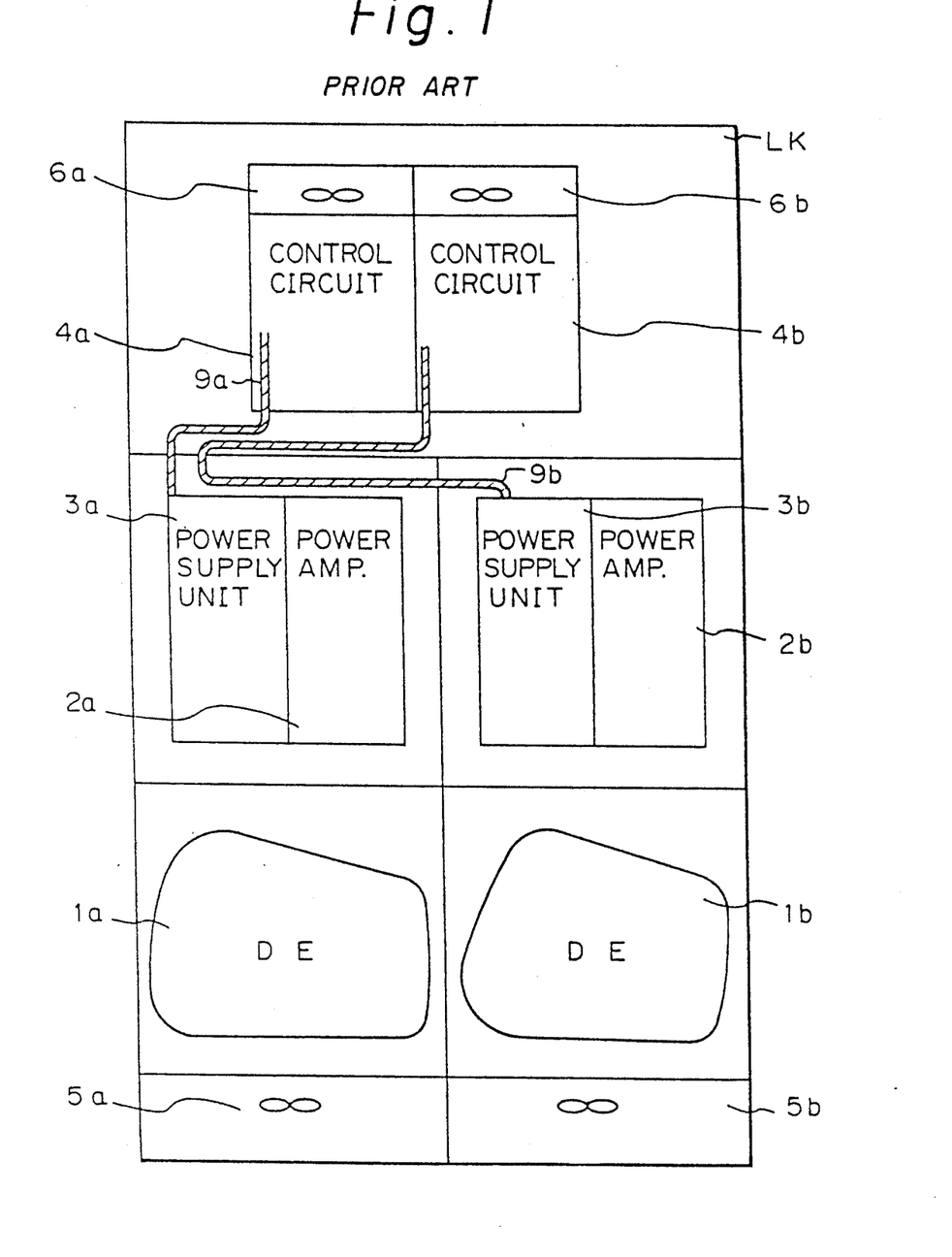
FIG. 1 shows the construction of a conventional rotating disc system.

FIG. 1 shows the construction of a conventional aggregated magnetic disc system.

In FIG. 1, reference LK denotes a locker, reference numeral 1a and 1b each denote a disc enclosure containing a magnetic disc mechanism, 2a and 2b each denote a power amplifier, 3a and 3b each denote a power supply unit, 4a and 4b each denotes a control circuit, 5a and 5b each denote a first cooling fan, 6a and 6b each denote a second cooling fan, and 9a and 9b each denote a power cable.

In the construction of FIG. 1, the portion constituted by the components with the reference numerals including "a" such as "1a" or "2a", etc., and the portion constituted by the components with the reference numerals including "b" such as "1b" or "2b", etc., are each operated as an individual rotating disc device.

The magnetic disc mechanism contained in the disc enclosure 1a or 1b comprises a rotating disc as a storage medium, a head for writing and reading data on the disc, and positioning mechanism for positioning the head, and the disc is rotating driven by a spindle motor, and the positioning mechanism is driven by a voice coil motor.

The spindle motor and the voice coil motor are each driven by a driver circuit which is realized by the above power amplifier 2a or 2b.

The control circuit 4a or 4b each controls a corresponding magnetic disc mechanism.

The power supply unit 3a or 3b each supplies an electric power to a corresponding power amplifier 2a or 2b and a corresponding control circuit 4a or 4b.

The power cable 9a or 9b connects a corresponding power supply unit 3a or 3b and a corresponding control circuit 4a or 4b.

Figure 2:
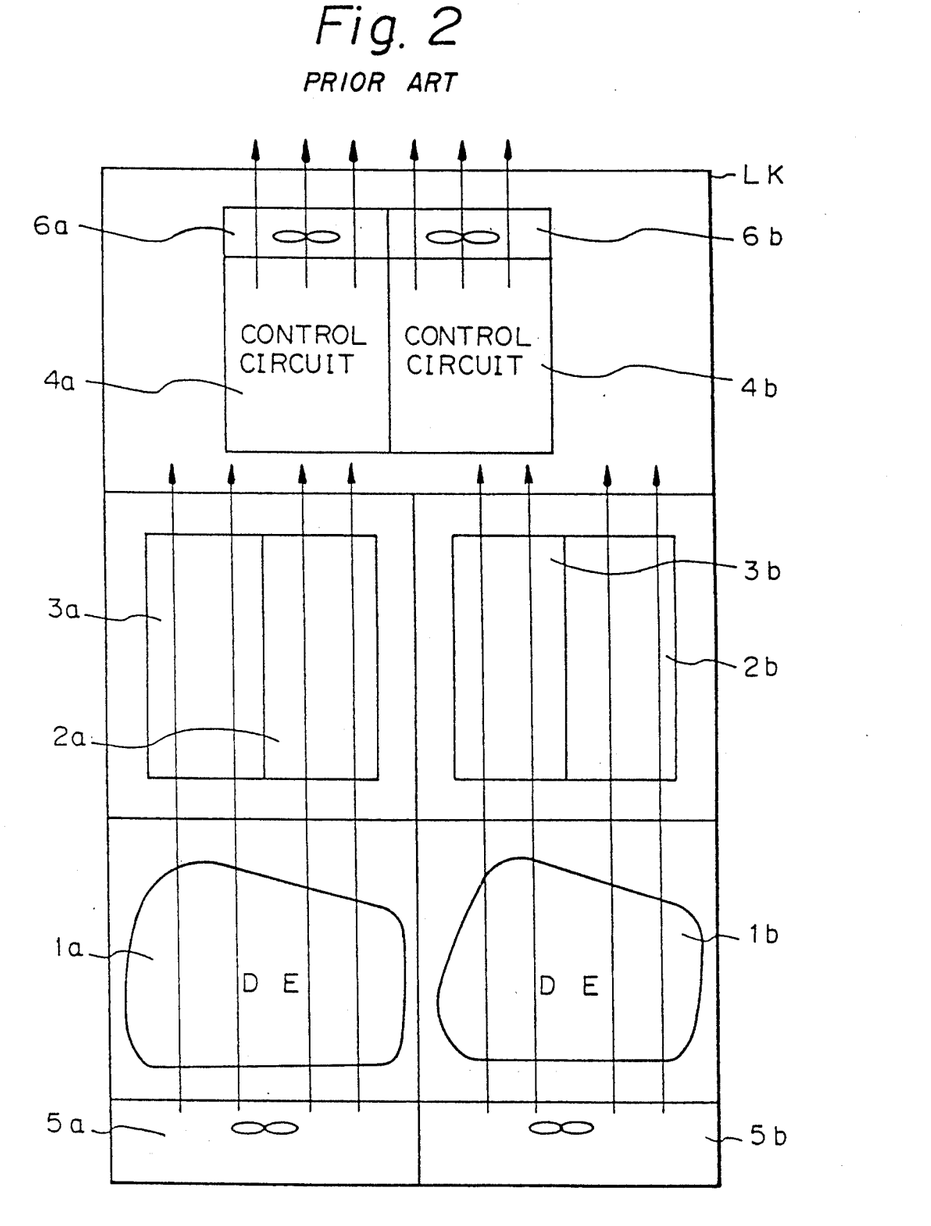
FIG. 2 shows the flows of the air streams generated by the cooling fans in the construction of a conventional rotating disc system.

The first cooling fan 5a cools the disc enclosure 1a, the power amplifier 2a, and the power supply unit 3a, and the first cooling fan 5b cools the disc enclosure 1b, the power amplifier 2b, and the power supply unit 3b. The second cooling fan 6a cools the control circuit 4a, and the second cooling fan 6b cools the control circuit 4b. The flows of the air streams generated by the cooling fans 5a, 5b, 6a and 6b are shown in FIG. 2.

As shown in FIG. 1, all the above construction is contained in the locker LK, and the components of the construction are arranged into a multi-layered construction so that a high density assembly of the aggregation of the plurality of rotating disc devices is realized.

The above construction has, however, the following problems:

(1) the power cable connecting the corresponding power supply unit 3a or 3b and the control circuit 4a or 4b, occupies a large volume in the space of the locker LK; and (2) the electric power is used ineffectively regarding the operation of the cooling fans.

The power supply units 3a and 3b each outputs low voltage (for example, +5 V, −5.2 V, ±12 V) currents and high voltage (for example, ±24 V) currents. The low voltage currents are mainly supplied to the control circuits 4a and 4b through the power cable 9a and 9b, respectively, and the high voltage currents are supplied to the power amplifiers 2a and 2b, respectively.

The low voltage currents supplied to the control circuits 4a and 4b are large, for example, 30A, and therefore, the power cables 9a and 9b must have a relatively large cross section. For example, a plain braided wire having a width of 3 cm, is used. Namely, the power cable 9a and 9b occupies a relatively large volume in the space of the locker LK.

Further, all the above components which are usually packed in the locker LK so as to realize a high density installation, however, some of the above components are installed movably because all the components must be accessible from the outside at the time of maintenance. The control circuit 4a or 4b is often one of the movably installed components, and therefore, a long cable is required for maintaining connection between the movable control circuit and the corresponding power supply unit even in the moved condition for maintenance. The long cable is folded when the movable components are packed in the condition of the high density installation. Namely, in the packed condition, a large volume is occupied by the folded long and thick cable connecting between the control circuits and the corresponding power supply units.

Regarding the effectiveness of the operation of the cooling fans, the control circuits 4a and 4b corresponding all magnetic disc mechanisms must always be in operating condition because the control circuit must communicate with an apparatus in the upper level even when the corresponding magnetic disc mechanism is not operated, and therefore, the power supply unit supplying electric power to the control circuit also must always operate. Thus, the first cooling fans 5a and 5b which cool the power supply units 3a and 3b together with the power amplifiers 2a and 2b and the disc enclosures 1a and 1b, must always operate even when the corresponding magnetic disc mechanism is not operated.

As the cooling fans 5a and 5b normally operates with a relatively high power for removing a relatively large amount of heat generated in the power amplifiers 2a and 2b, the power supply units 3a and 3b, and the disc enclosures 1a and 1b, a great amount of power is consumed ineffectively when the corresponding magnetic disc mechanism is not operated due to such a high power operation of the first cooling fans 5a and 5b.

Further, the above constant operation of the high-power cooling fans 5a and 5b causes a large noise even when the corresponding magnetic disc mechanism is not operated.

Thus, an effective operation of the cooling fans is required to solve the above problems.

SUMMARY OF THE INVENTION

An object of the present invention is to provide a rotating disc device wherein a high density assembly of components constituting the device is possible, and the cooling fans can operate effectively.

According to the present invention, there is provided a rotating disc device for storing digital data, comprising: a storage unit containing a spindle motor, a disc for storing digital data thereon and rotating by being driven by the spindle motor, a head for writing and reading data on the disc, and a positioning means for positioning the head; a driver circuit for driving the spindle motor and the positioning means; a control circuit for controlling the storage unit; a first power supply unit for supplying electric power to the driver circuit; and a second power supply unit for supplying electric power to the control circuit; the first power supply unit is positioned adjacent to the driver circuit, and the second power supply unit is positioned adjacent to the control circuit.

Further, a first cooling means is provided for cooling the first power supply unit, the storage unit, and the driver circuit; and a second cooling means is provided for cooling the second power supply unit and the control circuit.

DESCRIPTION OF THE PREFERRED EMBODIMENTS

Before describing the preferred embodiment of the present invention, first, the basic principle of the present invention is explained below.

Figure 3:
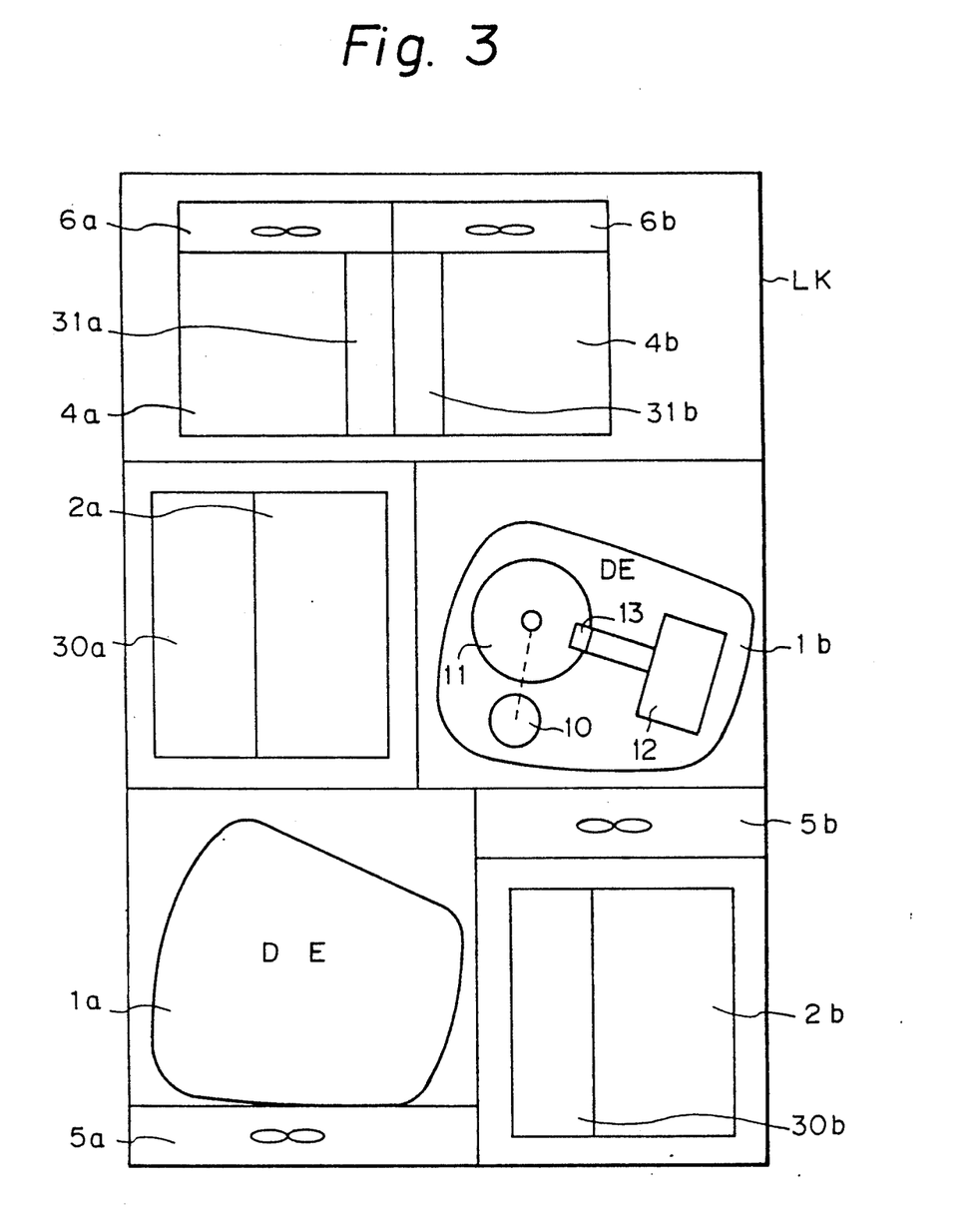
FIG. 3 shows the basic construction of the rotating disc system according to the present invention.

FIG. 3 shows the basic construction of the rotating disc device according to the present invention.

All reference numerals shown in FIG. 3 except 10, 11, 12, 12, 30a, 30b, 31a, and 31b, are the same as shown in FIG. 1, and similar to FIG. 1, the reference numerals which include "a", such as "1a" or "2a", etc., and the reference numerals which include "b", such as "1b" or "2b", etc. are each components of an independent rotating disc device.

Although the outline of the construction which is contained in the disc enclosure 1b is shown in FIG. 3, this is the same as the construction which is already explained with the construction of FIG. 1, i.e., reference numeral 10 denotes the spindle motor, 11 denotes the disc, 12 denotes the positioning mechanism, and 13 denotes the (magnetic) head.

Reference numerals 30a and 30b in FIG. 3 each denote a first power supply unit in the corresponding rotating disc device, and the reference numerals 31a and 31b in FIG. 3 each denote a second power supply unit in the corresponding rotating disc device. The first power supply units 30a and 30b are each positioned adjacent to the corresponding power amplifier 2a or 2b and the corresponding rotating disc mechanism contained in the corresponding disc enclosure 1a or 1b, and each supplies electric power to the corresponding power amplifier 2a or 2b and the corresponding rotating disc mechanism, respectively. The second power supply units 31a and 31b are each positioned adjacent to the corresponding control circuit 4a or 4b, and each supplies electric power to the corresponding control circuit 4a or 4b, respectively.

According to the above construction, the second power supply units 31a and 31b each can supply electric power directly to the corresponding control circuit 4a or 4b, respectively, i.e., it is not necessary to draw power over a power cable which occupies a large volume in the locker LK, as explained before. Thus, the total volume occupied by an individual rotating disc device is reduced, and therefore the volume of the total aggregated construction of the plurality of rotating disc devices can be reduced.

In addition, as a result of the arrangement wherein both the control circuit 4a or 4b (which must constantly operate even when the corresponding rotating disc mechanism is not operated) and the second power supply unit 31a or 31b which supplies electric power to the control circuit 4a or 4b are positioned in almost the same position, the corresponding second cooling fan 6a or 6b can cool both the corresponding control circuit 4a or 4b and the second power supply unit 31a or 31b, respectively. Thus, the other portion of the above control circuit 4a or 4b, the second power supply unit 31a or 31b, and the second cooling fan 6a or 6b, in particular, the first cooling fan 5a or 5b, can be OFF when the corresponding rotating disc mechanism is not operated.

Or, at least, each portion comprising the control circuit 4a or 4b, the second power supply unit 31a or 31b, and the second cooling fan 6a or 6b; and the other portion comprising the rotating disc mechanism, the first power supply unit 30a or 30b, the power amplifier 2a or 2b, and the first cooling fan 5a or 5b, each can be operated independently.

Thus, further, the above first cooling fan 5a or 5b can be operated according to the temperature of the portion comprising the rotating disc mechanism, the first power supply unit 30a or 30b, the power amplifier 2a or 2b, and the first cooling fan 5a or 5b, and can be stopped together with the corresponding portion comprising the rotating disc mechanism, the first power supply unit 30a or 30b, the power amplifier 2a or 2b, as realized in the preferred embodiment of the present invention explained later. This enables the effective control of the consumption of the electric power and the noise generated by the high power (first) cooling fan 5a or 5b.

Figure 4:
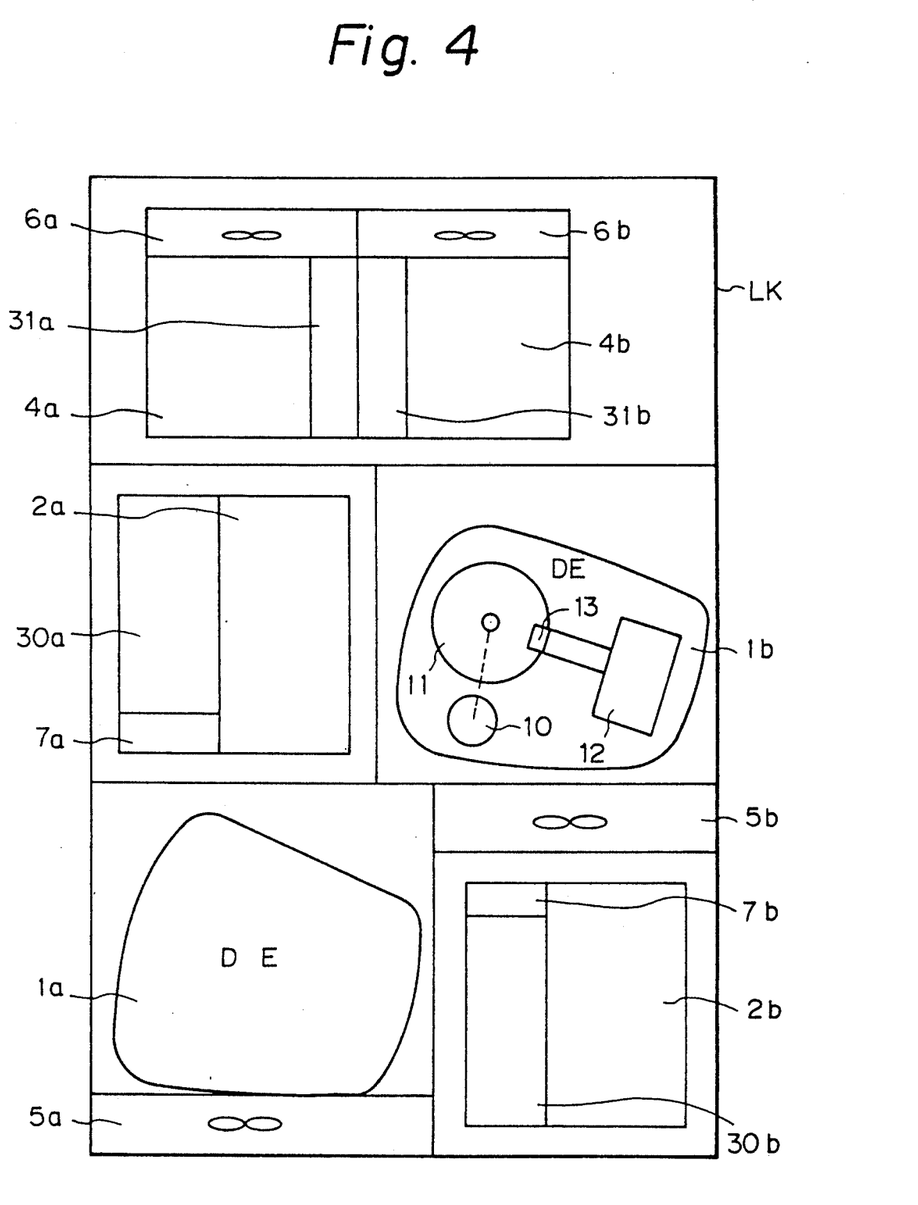
FIG. 4 shows the outlined construction of the rotating disc system having a temperature control function according to one aspect of the present invention.

FIG. 4 shows the outlined construction of the rotating disc system having a temperature control function, as a preferred embodiment of the present invention.

The only difference between the constructions shown in FIGS. 3 and 4 is the existence of the temperature detecting means 7a and 7b shown in FIG. 4.

Figure 5:
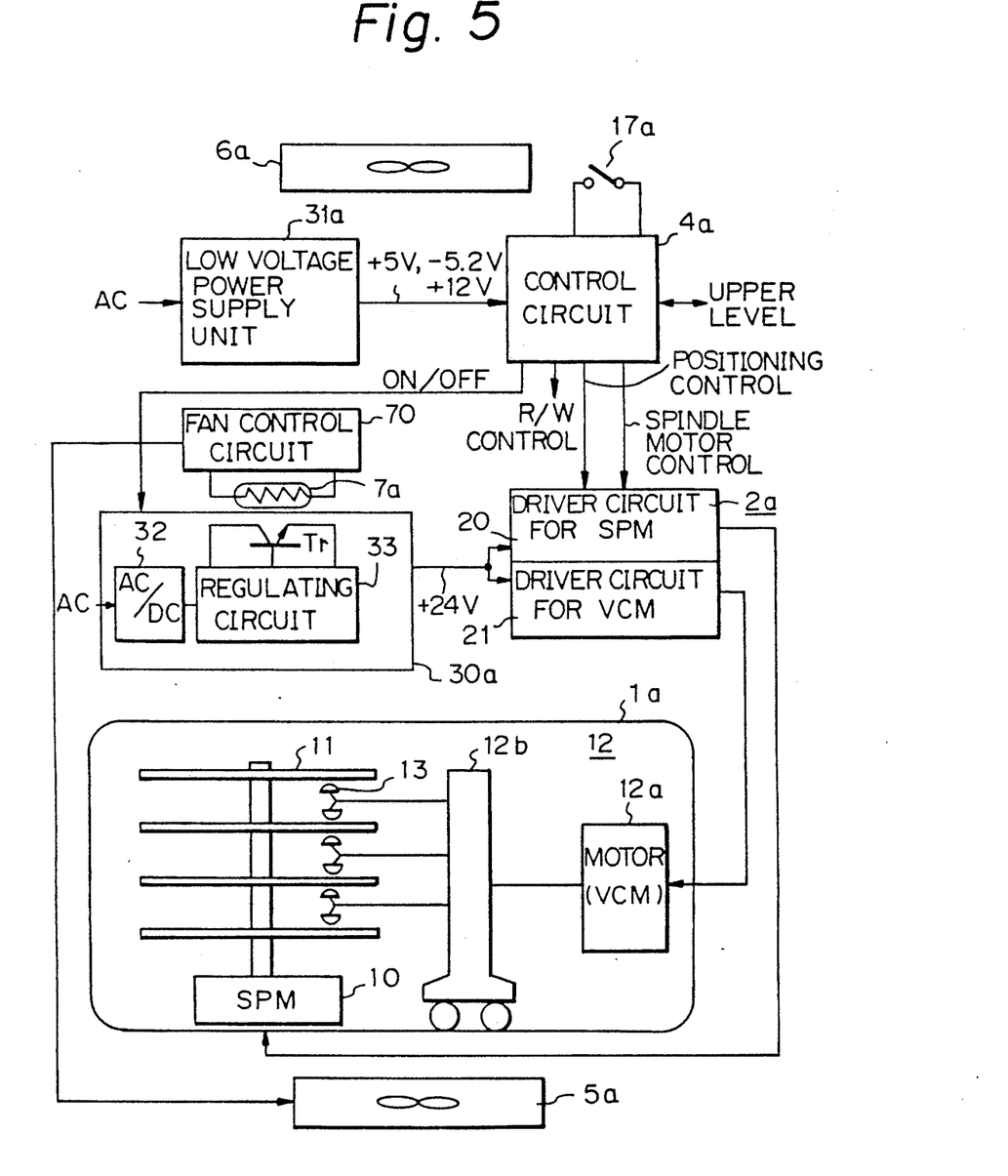
FIG. 5 shows the construction of an embodiment of an individual rotating disc device according to the present invention.

FIG. 5 shows the construction of an individual rotating magnetic disc device constituting the aggregated rotating magnetic disc system as an embodiment of the present invention, having an outlined construction as shown in FIG. 4.

In FIG. 5, the construction of the individual rotating magnetic disc device constituted by the components denoted by reference numerals including "a" is shown. The same reference numerals as FIG. 4 each denote the same components in FIG. 4.

In addition, as shown in FIG. 5, the aforementioned positioning mechanism 12 comprises the mentioned voice coil motor 12a and a carriage 12b supporting the magnetic) head 13, and the aforementioned power amplifier 2a comprises a driver circuit 20 for the spindle motor 10 and a driver circuit 21 for voice coil motor 12a, and the aforementioned first power supply unit 30a comprises a rectifying and smoothing circuit 32 and a DC voltage stabilizing circuit 32.

The aforementioned temperature detecting means 7a is realized by a thermistor, and the terminal voltage of the thermistor is detected by a fan control circuit 70 for controlling the first cooling fan 5a. The second power supply unit 31a is realized by a low voltage power supply unit. Further, an ON/OFF manual switch 17a is connected to the control circuit 4a.

The low power power supply unit 31a is on a printed circuit board (not shown), and is installed beside the control circuit 4, e.g., the printed circuit board of the low voltage power supply unit 31a and the control circuit 4a are connected to the same back panel without using a power cable connecting them, and the low voltage (for example, +5 V, -5.2 V, ±12 V) power supply unit 31a supplies a low voltage electric power to the control circuit 4a.

The high voltage (first) power supply unit 30a is installed beside the driver circuits 20 and 21, and both the high voltage (first) power supply unit 30a and the driver circuits 20 and 21 are contained in the same container box. Both the driver circuits 20 and 21 receives a high voltage (for example, +24 V) electric power from the high voltage (first) power supply unit 30a.

In the disc enclosure 1a, a plurality of magnetic discs 11 are rotated by the spindle motor 10. A plurality of magnetic heads 13 are supported by the carriage 12b, and are moved with the carriage 12b by the voice coil motor 12a for positioning (seeking) operation of the heads 13. The voice coil motor 12a is driven by the driver circuit 20, and the spindle motor 10 is driven by the driver circuit 21.

The control circuit 4a receives the above-mentioned low voltage electric power from the low voltage power supply unit 31a, and carries out an interfacing control of the communication with the upper level apparatus, a read/write control by the heads 13, a positioning control of the heads 13 through the driver circuit 20 and the voice coil motor 12a, and a control of the rotation of the spindle motor 10 through the power amplifier (driver circuit 21).

The rectifying and smoothing circuit 32 in the high voltage power supply unit 30a converts a commercial AC power to a DC power by rectifying and smoothing the AC power. The DC voltage stabilizing circuit 32 comprises, for example, a series regulator which includes a power transistor (denoted by Tr) connected in series to the load.

The temperature detecting means 7a realized by the thermistor is positioned beside the power transistor Tr, and the fan control circuit 70 controls the rotation speed of the high power (first) cooling fan 5a according to the terminal voltage of the thermistor 7a, i.e., the higher temperature is detected by the thermistor 7a, the higher the speed of the rotation is controlled.

The above operation enables an effective control of the electric power consumption by the cooling fan 5a and the noise of the fan 5a, and this operation is possible owing to the separation of the power supply unit into the unit 31a for constantly supplying low voltage electric power to the control circuit 4a and the unit 30a for adaptively supplying high voltage electric power to the components other than the control circuit 4a, including the cooling fan 5a.

On the other hand, the cooling fan 6a always operates for cooling the corresponding control circuit 4a constantly.

When the functions in the disc enclosure 1a is controlled to operates under the control of the control circuit 4a, the spindle motor 10 rotates, and the positioning operation of the heads 13 is driven by the voice coil motor 12a. To operate the motors, the high power power supply unit 30a and the driver circuits 20 and 21 operate, and therefore, the power transistors and the other circuit elements wherein electric power is consumed and which are used in the high power power supply unit 30a and the driver circuits 20 and 21, generate heat. In the disc enclosure 1a, the spindle motor 10 and the voice coil motor 12a generate heat, and the friction heat is generated by the friction between the rotating discs 11 and air.

The above-mentioned heat is detected through the temperature of the power transistor in the high voltage power supply unit 30a (otherwise, the temperature of the power transistor in the power amplifier 2a can be detected instead of the high voltage power supply unit 30a). Although the temperature may be detected at the disc enclosure 1a, however, the thermal capacity of the disc enclosure 1a is relatively large, therefore, the detection of the temperature of the power transistor in the high voltage power supply unit 30a or in the power amplifier 2a is preferable for effective control of the cooling fan 5a. Generally, the temperature can be detected in any other position beside the component which generates heat according to load current from the high voltage power supply unit 30a.

Figure 6:
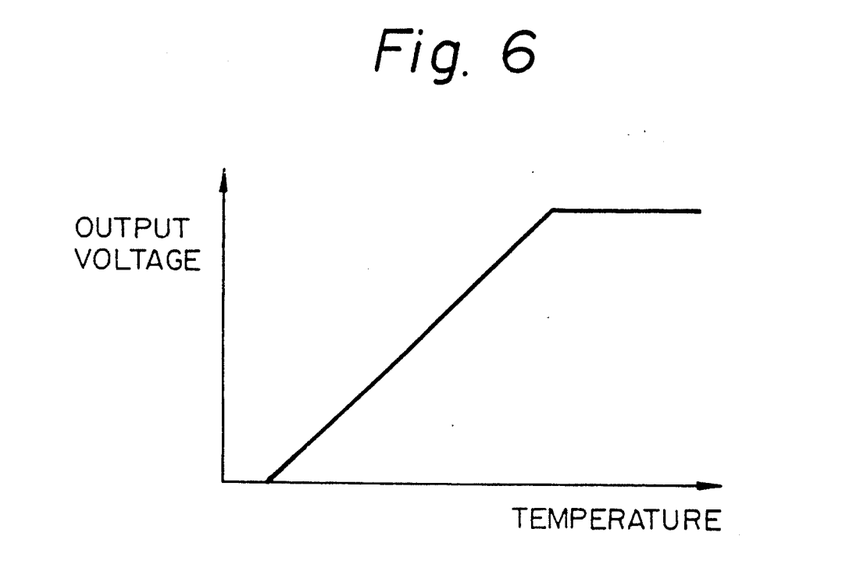
FIG. 6 shows the characteristic curve of the output voltage of the fan control circuit 70 in the construction of FIG. 5.
Figure 7:
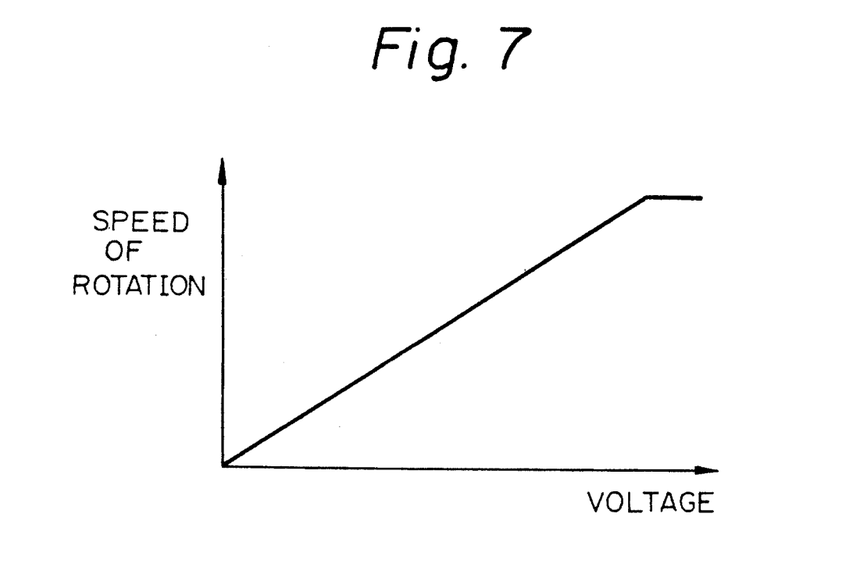
FIG. 7 shows the characteristic curve of the rotation speed of the cooling fan 5a in the construction of FIG. 5.

FIG. 6 shows the characteristic curve of the output voltage of the fan control circuit 70 in the construction of FIG. 5. According to an increase in the above-mentioned detected temperature, the output voltage of the fan control circuit 70 is raised up to a maximum value, and the rotation speed of the cooling fan 5a is increased with the output voltage. FIG. 7 shows the characteristic curve of the rotation speed of the cooling fan 5a in the construction of FIG. 5.

According to the above operation, when the temperature of the components to be cooled by the high power cooling fan 5a is low, or when the components do not operate, the rotation speed of the cooling fan 5a is lowered, and thus, the electric power consumption and the noise caused by the cooling fan 5a can be minimized.

Although the characteristic shown in FIG. 6 is continuous, in an other way, a step like characteristic is also applicable.

Further, when the ON/OFF switch 17a is opened, the high power power supply unit 30a is controlled not to supply the electric power to the driver circuits 20 and 21, and therefore, the functions in the disc enclosure 1a are stopped, and the high power cooling fan 5a which receives the electric power from the high voltage power supply unit 30a is stopped through the stopping control by the control circuit 4a according to the switch OFF operation. This operation also enables an effective control of the electric power consumption by the cooling fan 5a and the noise of the fan 5a, and this operation is also possible owing to the above-mentioned separation of the power supply unit.

Figure 8:
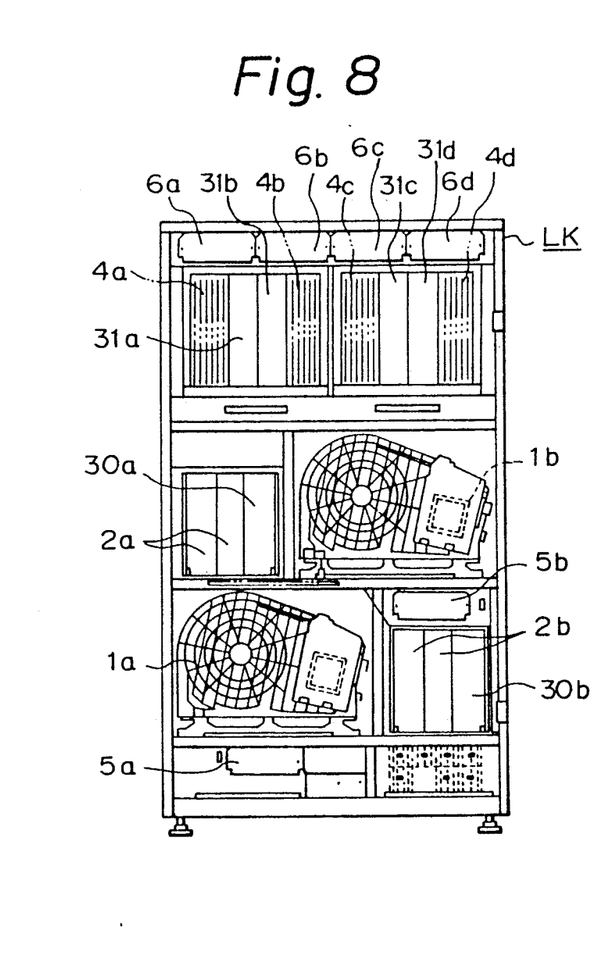
FIG. 8 shows the rear view of an embodiment of the rotating disc system according to the present invention.
Figure 9:
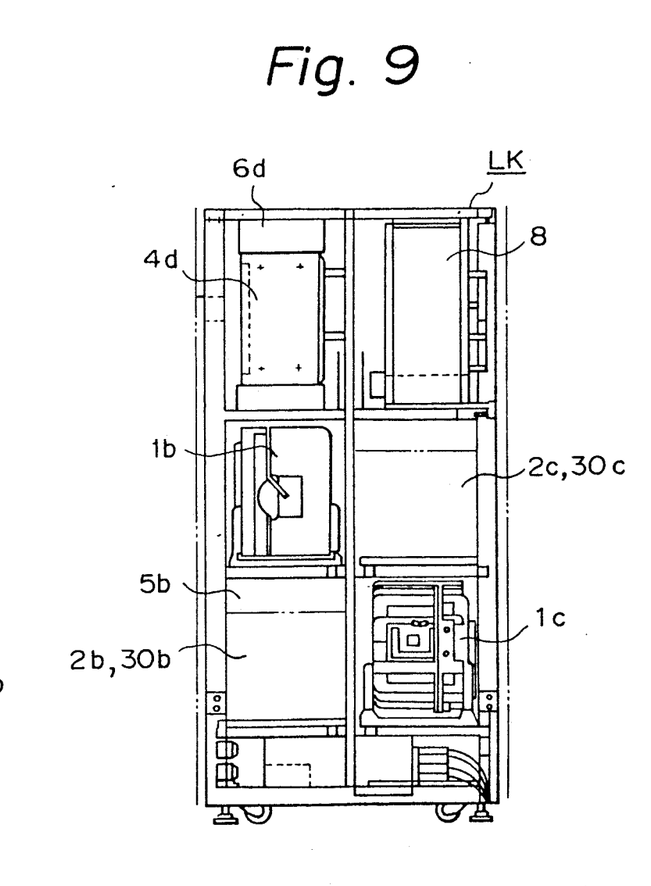
FIG. 9 shows the side view of an embodiment of the rotating disc system according to the present invention.
Figure 10:
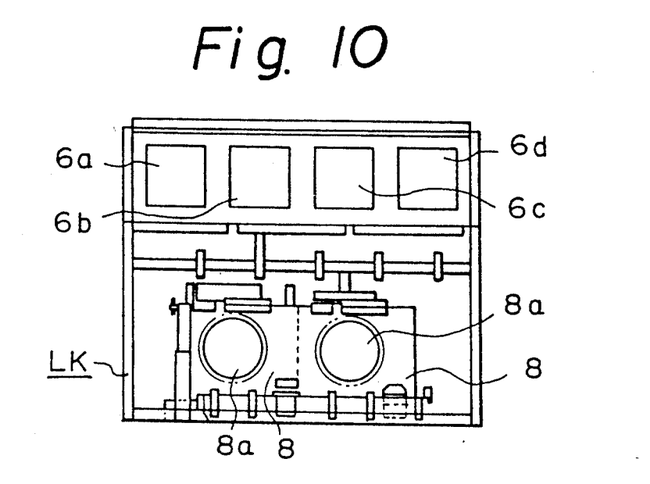
FIG. 10 shows the top view of an embodiment of the rotating disc system according to the present invention.
Figure 11:
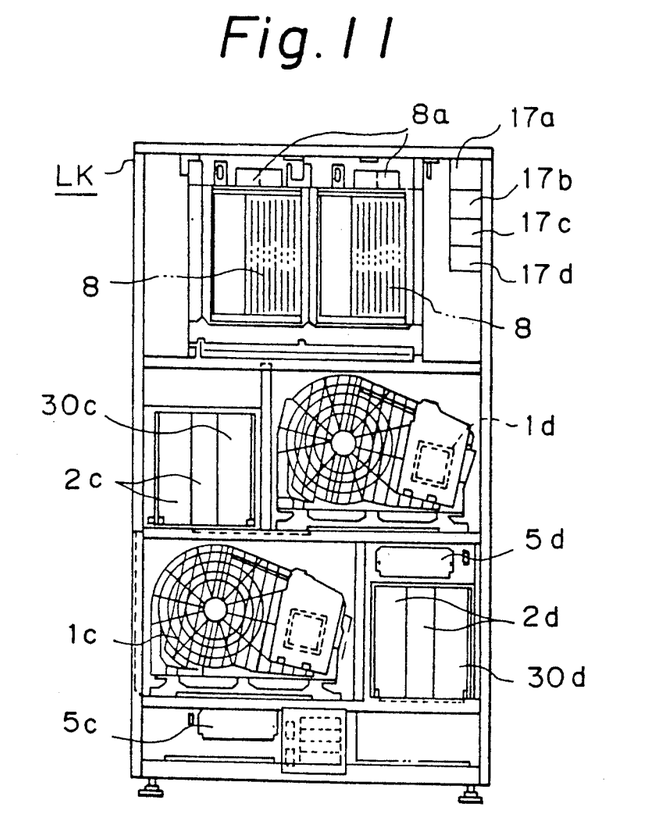
FIG. 11 shows the front view of an embodiment of the rotating disc system according to the present invention.

FIG. 8 shows the rear view, FIG. 9 shows the side view, FIG. 10 shows the top view, and FIG. 11 shows the front view of an embodiment of the rotating disc system according to the present invention.

In FIGS. 8 to 11, the same reference numerals as those shown in FIGS. 1 to 7 each denote the same component.

In the embodiment of FIGS. 8 to 11, four independent rotating (magnetic) disc devices are installed in three layers of the locker LK.

In the rear side of the upper layer of the locker LK, four control circuits (printed circuit boards) 4a to 4d for the above four devices, the low voltage power supply units 31a to 31d each for supplying +5 V, −5.2 V, and ±12 V electric power to the corresponding control circuit, and the cooling fans 6a to 6d for cooling the corresponding control circuit and the corresponding low voltage power supply unit, are installed.

In the front side of the upper layer of the locker LK, a disc switch circuit 8 for switching the disc enclosures 1a to 1d, a power supply unit for the disc switch circuit 8, a cooling fan 8a for the disc switch circuit 8 and the power supply unit, and the aforementioned ON/OFF switches 17a to 17d of the disc enclosures 1a to 1d, are installed.

In the front side of the middle layer of the locker LK, the disc enclosure 1b, the driver circuit 2a for the disc enclosure 1a, and the high voltage power supply unit 30a for the driver circuit 2a having the temperature detector 7a, are installed, and in the rear side of the middle layer of the locker LK, the disc enclosure 1d, the driver circuit 2c for the disc enclosure 1c, and the high voltage power supply unit 30c for the driver circuit 2c having the temperature detector 7c, are installed.

In the front side of the lower layer of the locker LK, the disc enclosure 1a, the driver circuit 2b for the disc enclosure 1b, the high voltage power supply unit 30b for the driver circuit 2b having the temperature detector 7b, and the high power cooling fan 5b are installed.

In the rear side of the lower layer of the locker LK, the disc enclosure 1c, the driver circuit 2d for the disc enclosure 1d, and the high voltage power supply unit 30d for the driver circuit 2d having the temperature detector 7d, and the high power cooling fan 5d, are installed.

Further, in the lower layer, the high power cooling fan 5a is installed under the disc enclosure 1a, the high power cooling fan 5c is installed and under the disc enclosure 1c.

In the above arrangement, each high power cooling fan 5a to 5d generates an air stream in the upper direction, and cools the corresponding disc enclosure, the driver circuit, and the high voltage power supply unit which are positioned in the way of the air stream.

On the other hand, the control circuits 4a to 4d and the low voltage power supply units 31a to 31d are each constantly cooled by the corresponding cooling fan 6a to 6d each of which generates an air stream in the upper direction.

In addition, in the construction shown in FIGS. 8 to 11, the disc enclosure 1a, a combination of the high voltage supply unit 3a and the driver circuit 2a, and the high power cooling fan 5a are aligned in a direction so that the high power cooling fan 5a can cool both the high voltage power supply unit 3a and the driver circuit 2a; and the disc enclosures 1a and 1b in a pair of the rotating disc devices are installed in different layers of the locker LK from each other.

We claim:

1. A rotating disc device for storing digital data, comprising:
   a storage unit containing:
      a spindle motor,
      a disc for storing digital data thereon, and rotating by being driven by said spindle motor,
      a head for writing and reading data on said disc, and
      a positioning means for positioning said head;
   a driver circuit for driving said spindle motor and said positioning means;
   a control circuit for controlling said storage unit;
   a first power supply unit for supplying electric power to said driver circuit; and
   a second power supply unit for supplying electric power to said control circuit;
   said first power supply unit is positioned adjacent to said driver circuit, and said second power supply unit is positioned adjacent to said control circuit.

2. A rotating disc device according to claim 1, further comprising:
   a first cooling means for cooling said first power supply unit, said storage unit, and said driver circuit; and
   a second cooling means for cooling said second power supply unit and said control circuit.

3. A rotating disc device according to claim 2, further comprising:
   a temperature detecting means for detecting temperature of said first power supply unit; and
   a cooling control unit for controlling the cooling by said first cooling means.

4. A rotating disc device according to claim 2, further comprising:
   an ON/OFF switch means for starting/stopping the operation of said storage unit, said first power supply unit, and said first cooling means.

5. A rotating disc device according to claim 4, further comprising:
   a temperature detecting means for detecting temperature of said first power supply unit; and
   a cooling control unit for controlling the cooling by said first cooling means.

6. A rotating disc system for storing digital data, comprising a plurality of rotating disc devices, each of said plurality of rotating disc devices comprising:
- a storage unit containing:
  - a spindle motor,
  - a disc for storing digital data thereon, and rotating by being driven by said spindle motor,
  - a head for writing and reading data on said disc, and
  - a positioning means for positioning said head;
- a driver circuit for driving said spindle motor and said positioning means;
- a control circuit for controlling said storage unit;
- a first power supply unit for supplying electric power to said driver circuit;
- a second power supply unit for supplying electric power to said control circuit;
- a first cooling means for cooling said first power supply unit, said storage unit, and said driver circuit; and
- a second cooling means for cooling said second power supply unit and said control circuit;
- said first power supply unit is positioned adjacent to said driver circuit, and said second power supply unit is positioned adjacent to said control circuit.

7. A rotating disc system according to claim 6, wherein each of said plurality of rotating disc devices further comprising:

an ON/OFF switch means for starting/stopping the operation of said storage unit, said first power supply unit, and said first cooling means.

8. A rotating disc system according to claim 7, wherein each of said plurality of rotating disc devices further comprising:
- a temperature detecting means for detecting temperature of said first power supply unit; and
- a cooling control unit for controlling the cooling by said first cooling means.

9. A rotating disc system according to claim 6, further comprising a casing having a plurality of layers for installing therein the storage units, the driver circuits, the control circuits, the first power supply units, the second power supply units, the first cooling means, and the second cooling means of said plurality of rotating disc devices of said rotating disc system; wherein, in each of said plurality of rotating disc devices,
- said storage unit, a combination of said first power supply unit and said driver circuit, and said first cooling means are aligned in a direction so that said first cooling means can cool both the first power supply unit and the driver circuit; and
- in a pair of said plurality of rotating disc devices, the storage units in a pair of said rotating disc devices are installed in different layers of said casing from each other.

* * * * *